Dec. 7, 1965   J. W. D. JOHANSSON   3,221,581
LONGITUDINAL STOP MEANS FOR LATHES
Filed March 6, 1964
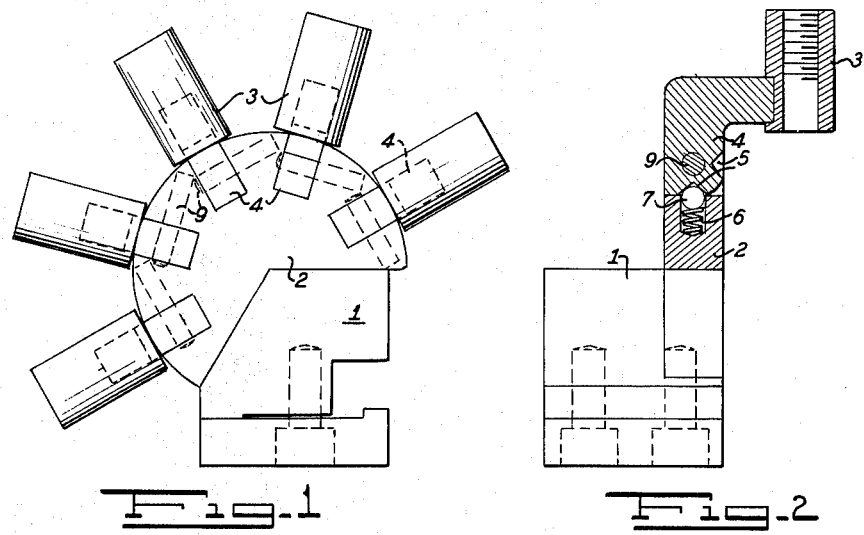
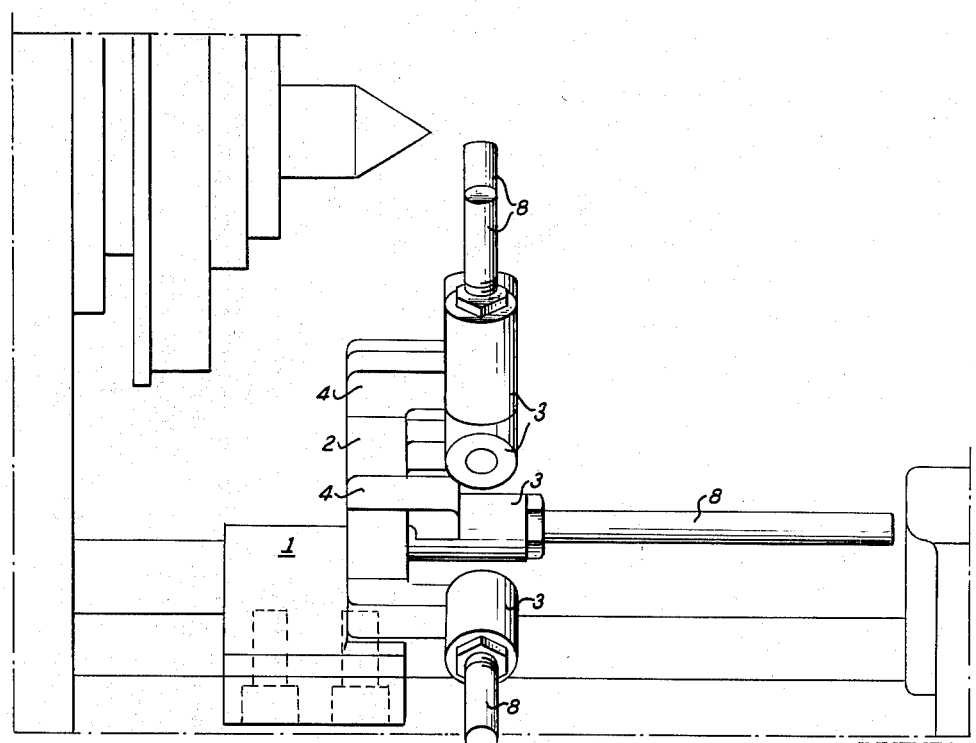
INVENTOR
JONAS WALFRED DEMANDER JOHANSSON

United States Patent Office 3,221,581
Patented Dec. 7, 1965

3,221,581
LONGITUDINAL STOP MEANS FOR LATHES
Jonas Walfred Demander Johansson, Bjorkmossavägen 3, Virserum, Sweden
Filed Mar. 6, 1964, Ser. No. 349,848
Claims priority, application Sweden, Mar. 7, 1963, 2,480/63
2 Claims. (Cl. 82—34)

The present invention relates to a longitudinal stop means for lathes, especially for support-lathes.

In modern lathes the mandrel head stock as a rule is so constructed that a longitudinal stop of conventional type cannot be accommodated for reasons of space. In addition, the known types of longitudinal stops have numerous disadvantages in that they require a relatively large amount of time to be made operative, while moreover, they are not always sufficiently accurate so that the necessary precision can be maintained with respect to the ever increasing demands regarding tolerance.

One of the reasons for lack of precision in known longitudinal stops is that the different stop positions are not established with their starting points from one and the same reference surface but, generally, each position is established from a different such surface or point. In addition, displacement can easily occur of the longitudinally displaceable and fixable stop pins usually used as stop members, which not only implies tolerance displacement for each particular processing gage but across mutual distance alterations varying in an uncontrollable manner between the process places on the work piece. In lathes with automatic release in the so-called apron, this can also contribute to an untimely displacement of the release points of time which then affect the tolerance gauges.

However, these disadvantages are removed by the invention, which is principally characterized by a frame fixable to the lathe guide and provided with a plate positioned at right angles to the prism, which plate for example is in the form of a sector of a circle along the periphery of which a number of holders for stop pins are adjustably fixed in radially directed recesses, the longitudinal axis of which pins in fixed end position in the holders coincides with an axis through the center of the plate at right angles to the plate and the longitudinal axis of which pins in a second fixed position in the holders forms, for example, a right angle with the said axis through the center of the plate.

The invention will be further explained below with reference to an embodiment diagrammatically illustrated in the attached drawings, and in connection with this, further characterizing features of the invention will be set forth.

In the drawings:

FIGURE 1 shows a stop means according to the invention seen from the front facing the mandrel headstock of the lathe.

FIGURE 2 shows a side view of the same stop means and a section through one of the stop members in the means.

FIGURE 3 shows a side view of a lathe with a mandrel headstock, carriage guide and apron together with the stop means according to the invention fixed to the carriage guide in operative position.

The embodiment of the stop means according to the invention shown in the drawing consists of a support stand 1 which in accordance with FIGURE 3 is fixable to the carriage guide by means of a clamp together with fixing bolts. The support stand is constructed with a fixed plate 2, suitably in the form of a sector of a circle, along the periphery of which a number of radially directed recesses are formed. In each such recess a holder 3 for a stop pin 8 is pivotally mounted. The holder consists of an angle piece 4, terminated by a tube-shaped socket which is internally threaded for receiving the corresponding threaded stop pin 8.

All the holders 3 shown in FIGURE 1 are separately and individually connected by 9 to plate 2 for movement from the inoperative position shown in FIGURE 2 to an operative position in which the central axis of the threaded socket coincides with the central axis of the plate 2. It is of course understood that only one holder at a time can be placed into operative position. In the folded-down or operative position, the end surface of each socket firmly abuts the plane of the plate, which thus forms one and the same reference plane for all the holders and stop pins in their operative positions.

In order to latch the holders firmly in their operative and inoperative positions, each angle piece 4 has two indentations 5 with which a ball actuated by a spring 6 cooperates. This spring is inserted into a corresponding hole at the bottom of each radial recess. A ball lock is thereby formed which relatively easily releasably latches the holders in both the adjustment positions, in one of which the axis of the stop pin coincides with the axis of the plate 2 and in the other of which the axis of the stop pin, for example as shown in the drawing, forms a right angle with the axis of the plate.

The advantages of the arrangement according to the invention are thus clear, namely that the same reference plane is obtained for each stop pin, i.e. the central area on the plate. The stop pins can be precision manufactured and fixed in exact positions in the holders and therefore keep the production tolerances with especially great accuracy from workpiece to workpiece.

The invention is not limited to the embodiment shown and described but can be varied in many ways within the spirit and scope of the following claims.

Having now described the invention, what I claim as new and desire to secure by Letters Patent, is:

1. A longitudinal stop device for a lathe, said device comprising a frame adapted for being secured to the carriage guide of a lathe, a plate secured with said frame for extending at right angles to the carriage guide, said plate having an axis, a plurality of stop pin holders each having an individual axis and adapted for carrying an associated stop pin in coincidence with the holder axis and means pivotally connecting said holders to said plate for separate and individual pivotal movement between operative and inoperative positions in which said holders in the operative position abut the plate such that the respective axes of the holders coincide with the axis of the plate whereby the pins will also coincide with the axis of the plate, said plate thereby constituting a common reference surface for all the holders.

2. A stop device as claimed in claim 1, wherein each of said stop pin holders comprises an angle member pivotally connected to the plate and a tubular socket connected to the angle member at one end thereof, said tubular socket being adapted for carrying the associated stop pin, said plate having a periphery with recesses therein for accommodating the angle members of the stop pin holders, and a ball in the plate adjacent each recess and resiliently urged towards said recess, each angle member having two indentations in an end thereof remote from the respective socket member, said ball being releasably inserted in respective of the indentations corresponding to the operative and inoperative positions of the the stop pin holder.

(References on following page)

References Cited by the Examiner

UNITED STATES PATENTS

| | | | |
|---|---|---|---|
| 648,178 | 4/1900 | Schellenbach | 29—65 |
| 1,000,442 | 8/1911 | Schellenbach. | |
| 1,249,275 | 12/1917 | Dodge et al. | 29—65 |

FOREIGN PATENTS

| | | |
|---|---|---|
| 1,123,531 | 6/1956 | France. |
| 6,583 | 3/1902 | Great Britain. |

WILLIAM W. DYER, JR., *Primary Examiner.*

L. VLACHOS, *Assistant Examiner.*